USOO6301298B1

(12) United States Patent
Kuntz et al.

(10) Patent No.: US 6,301,298 B1
(45) Date of Patent: Oct. 9, 2001

(54) ADAPTIVE EQUALIZER WITH COMPLEX SIGNAL REGENERATION AND METHOD OF OPERATION

(75) Inventors: Thomas L. Kuntz, Portland; Nikhil Deshpande, Beaverton, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/185,416

(22) Filed: Nov. 3, 1998

(51) Int. Cl.[7] .............................. H03H 7/30; H03D 1/24; H04N 7/12; G06F 17/10
(52) U.S. Cl. .......................... 375/232; 375/321; 348/404; 708/322
(58) Field of Search .................................. 375/232, 229, 375/235, 233, 261, 270, 268, 320, 321, 350; 348/404, 472, 667; 708/322, 323

(56) References Cited

U.S. PATENT DOCUMENTS

| 5,386,239 | * | 1/1995 | Wang et al. ............... | 348/472 |
| 5,561,468 | * | 10/1996 | Bryan et al. ............... | 348/469 |
| 5,673,293 | * | 9/1997 | Scarpa et al. ............... | 375/321 |
| 5,684,827 |   | 11/1997 | Nielsen. | |
| 5,692,010 |   | 11/1997 | Nielsen. | |
| 5,799,037 | * | 8/1998 | Strolle et al. ............ | 375/233 |
| 5,805,481 | * | 9/1998 | Raghunath ............... | 708/322 |
| 6,188,441 | * | 2/2001 | Limberg ............... | 348/555 |

OTHER PUBLICATIONS

"VSB Modulation Used for Terrestrial and Cable Broadcasts" by Gary Sgrignoli, Wayne Bretl, Richard Citta, Zenith Electronics Corporation, Jun. 1995.

* cited by examiner

Primary Examiner—Chi Pham
Assistant Examiner—Khai Tran
(74) Attorney, Agent, or Firm—William K. Bucher

(57) ABSTRACT

An adaptive equalizer for use in a digital transmission receiver includes Q-channel regeneration. A equalization filter produces complex valued equalized signal samples representative of a digital transmission signal. A slicer produces ideal real component values of the equalized signal samples. A Q-regeneration filter produces ideal imaginary component values of the equalized signal samples from the ideal real component values. The ideal real and imaginary component values are combined with the component values of the equalized signal samples to produce a complex valued error signal. The error signal is fed back to scale update values for updating coefficient values of the equalization filter. Delays in the equalizer provide storage to synchronize various equalizer signal and component values with the Q-regeneration filter output.

29 Claims, 4 Drawing Sheets

US 6,301,298 B1

ADAPTIVE EQUALIZER WITH COMPLEX SIGNAL REGENERATION AND METHOD OF OPERATION

BACKGROUND OF THE INVENTION

The present invention relates generally to adaptive equalizers and more particularly to an adaptive equalizer and method of operation that regenerates ideal real and imaginary component values from a complex valued digital signal for producing a complex valued error signal.

Data-bearing signals are often distorted by the transmission path, or channel, which they traverse between the transmitter and receiver. The distortion may be caused by the physical channel medium, such as free space, cable and the like, or nonlinear behavior of the transmitter and receiver. When such distortion consists of frequency-dependent magnitude and phase deviations of the signal, it can be corrected at the receiver by filtering the received signal with a linear filter which has inverse magnitude and phase response with respect to that of the channel. The inverse filter is called an equalizing filter, and the process of determining the filter coefficients and performing the filtering is called equalization.

The Stochastic Gradient (SG) algorithm is an efficient method to derive the value of the equalizing filter coefficients. The SG algorithm requires that a reference waveform of ideal (undistorted) data symbols be available at the receiver. When the transmitted signal contains random data unknown to the receiver, the ideal waveform can be estimated by regenerating it from the received and possibly distorted symbols. This operation can be implemented by "slicing" the received symbols to the closest ideal symbol points or levels. As long as relatively few error are made in the slicing process, the SG algorithm will converge toward the correct equalization filter.

FIG. 1 show a representative adaptive equalizer 10 for digital signals that is known in the art and generally includes a multi-tap digital filter 12 through which an unequalized digital signal passes. A slicer 14 continuously processes the equalized digital signal from the digital filter and generates ideal amplitude values of the digital levels in the signal. The ideal amplitude values are processed with the corresponding digital levels of the equalized digital signal to generate an error signal. A summation circuit 16 providing a difference output is an example of a circuit for producing the error signal. A correlator 18 receives the error signal and the unequalized digital signal. The correlator 18 performs a series of multiplications of the error signal with the unequalized digital signal, to produce a scaled output. The scaled correlator 18 output is combined with the old tap values 22 of the digital filter 12 in adder 20 to develop new tap values for the filter 12. For linear impairments in the digital signal, the circuit nullifies the effects of such impairments in the output signal.

Adaptive equalizers are employed in various configurations depending to the type of digital transmission system. In a quadrature amplitude modulation (QAM) system, for example, both the I (real) and Q (imaginary) channels are independent and data bearing. Slicers are provided for both channels for generating the ideal amplitude values for the real and imaginary data. In the advanced television (ATV) system, implemented using an 8-VSB digital transmission system, complex digital symbols (I+jQ) are generated with the in-phase or data bearing component of the signal contained in the real part of the complex signal. The imaginary part of the complex signal is used for suppressing a portion of the signal spectrum for more efficient bandwidth use. Ideal "I" or real symbols can be obtained by slicing the received "I" symbols to ideal reference levels. However, in 8-VSB, in contrast to signals such as QAM, the Q-channel signal is a function of the I-channel data symbols, and has a nearly continuous range of levels at symbol instances. Therefore, it is not possible to simply slice the received Q levels to ideal levels.

What is needed is an adaptive equalizer for equalizing complex digital signal samples where the Q-channel or imaginary component of the complex signal is a function of the I-channel or real component of the complex signal. The adaptive equalizer needs to regenerate ideal imaginary component levels from the sliced ideal real component levels of the complex signal to generate a complex error signal for driving the convergence of the filter coefficients of the equalizing filter. The adaptive equalizer needs to use the distortion information available in the Q-channel signal for improving the convergence of the equalizer process and the approximation of the inverse channel equalizing filter.

SUMMARY OF THE INVENTION

Accordingly, an object of the present invention is an adaptive equalizer that regenerates an ideal reference Q-channel signal from an ideal reference I-channel signal.

Another object of the present invention is an adaptive equalizer that generates a complex error signal for driving the convergence of the equalizer process.

A further object of the present invention is generating a complex valued reference signal from the complex valued equalized signal samples.

The adaptive equalizer with Q-channel regeneration of the present invention includes a filter system receiving complex valued unequalized signal samples and generating complex valued equalized signal samples. A slicer receives the real component values of the complex valued equalized signal samples and generates ideal real component values. A complex valued error signal generator receives the ideal real component values and the complex valued equalized signal samples and produces a complex valued error signal. The real component values of the error signal are derived from the real component values of the complex valued equalized signal samples and the ideal real component values. The imaginary component values of the complex valued error signal are derived from the imaginary component values of the complex valued equalized signal samples and ideal imaginary component values regenerated from the ideal real component values. The complex valued error signal is combined with time aligned vectors of complex valued unequalized signal samples in the filter system for updating filter coefficient values of the filter system.

The filter system includes a equalization filter having filter coefficient values updatable from initial values that generates the complex valued equalized signal samples from the received complex valued unequalized signal samples. The complex valued unequalized signal samples are also applied to a delay that generates delayed vectors of complex valued unequalized signal samples time aligned with the complex valued error signal values from the complex valued error signal generator. A multiplier receives the time aligned vectors and the complex valued error signal and generates equalization filter coefficient correction values. The coefficient correction values are applied to an adder that receives the current equalization filter coefficient values for generating updated equalization filter coefficient values.

The complex valued error signal generation has a regeneration filter that receives the ideal real component values from the slicer and generates ideal imaginary component values. In the preferred embodiment of the present invention, the regeneration filter is a FIR filter having filter coefficients that produce imaginary component values corresponding to a raised cosine filter. A first delay receives the ideal real component values and generates ideal real component values that are time aligned with the generated ideal imaginary component values. A second delay receives the complex valued equalized signal samples and generates complex valued equalized signal samples that are time aligned with the ideal real and imaginary component values. A combiner receives the time aligned complex valued equalized signal samples and the ideal real and imaginary component values and generates the complex valued error signal from the difference between the time aligned complex valued equalized signal samples and the ideal real and imaginary component values. The complex valued error signal generation may further include a multiplier receiving the complex valued error signal and a variable scaler value for scaling the complex valued error signal.

In the preferred embodiment of the adaptive equalizer of the present invention an offset filter receives the real component values of the error signal and generates an output signal representative of a DC offset in the real component values of the complex valued unequalized signal samples. A combiner receives the output of the offset filter and real component values of the complex valued unequalized signal samples and generates real component values of the complex valued unequalized signal samples with reduced DC offset by taking the difference between the complex valued unequalized signal samples and the output of the offset filter. The adaptive equalizer of the present invention may also be provided with an equalizer convergence detector that receives the real component values of the error signal and generates an output signal to indicate achievement of equalizer convergence.

The method of equalizing complex valued unequalized signal samples according to the present invention includes as one of the steps filtering the complex valued unequalized signal samples using a equalization filter having updatable filter coefficients to produced complex valued equalized signal samples. The method also includes the steps of slicing real component values of the complex valued equalized signal samples to produce ideal real component values, generating a complex valued reference signal using the ideal real component values as an input to an imaginary component value regeneration filter and time aligning the ideal real component value with the ideal imaginary component value, and generating a complex valued error signal by determining the difference between time aligned complex valued equalized signal samples and the reference signal. The filter coefficients of the equalization filter are updated by combining the complex valued error signal with time aligned vectors of complex valued unequalized signal samples to produce filter coefficient update values that are combined with the current filter coefficients.

The complex valued reference signal generating step includes the step of delaying the ideal real component values an amount corresponding to the delay produced by the regeneration filter. The complex valued error signal generating step includes the step of delaying the complex valued equalized signal samples an amount corresponding to the delay produced by the regeneration filter and the updating step includes the step of delaying the vectors of complex valued unequalized signal samples an amount corresponding to the delay produced by the regeneration filter.

In the preferred embodiment, the method further includes the steps of generating an offset signal from the real component values of the complex valued error signal representing a DC offset in the complex valued unequalized signal samples, and combining the offset signal with the complex valued unequalized signal samples to reduce the DC offset in the unequalized signal samples prior to filtering. Another additional step includes scaling the complex valued error signal by a variable convergence factor. Further additional steps includes calculating running standard deviation values of the real component values of the complex valued error signal, and generating an output signal to indicate achievement of equalizer convergence.

The adaptive equalizer of the present invention includes a machine readable medium having stored thereon a series of instructions which, when executed by a processor of a transmission system receiver, equalizes complex valued unequalized signal samples by causing the processor to filter the complex valued unequalized signal samples using a equalization filter having updatable filter coefficients to produced complex valued equalized signal samples, The processor executes instructions that slice real component values of the complex valued equalized signal samples to produce ideal real component values, generates a complex valued reference signal using the ideal real component values as an input to an imaginary component value regeneration filter and time aligning the ideal real component value with the ideal imaginary component value, and generates a complex valued error signal by determining the difference between time aligned complex valued equalized signal samples and the reference signal. The processor further executes instructions that update the filter coefficients of the equalization filter by combining the complex valued error signal with time aligned vectors of complex valued unequalized signal samples to produce filter coefficient update values that are combined with the current filter coefficients.

The machine readable medium additionally includes a series of stored instructions which, when executed by the processor, causes the processor to delay the ideal real component values an amount corresponding to the delay produced by the regeneration filter when generating of the complex valued reference signal includes instructions.

The machine readable medium also includes a series of stored instructions which, when executed by the processor, causes the processor to delay the complex valued equalized signal samples an amount corresponding to the delay produced by the regeneration filter when generating of the complex valued error signal.

The machine readable medium further includes a series of stored instructions which, when executed by the processor, causes the processor to delay the vectors of complex valued unequalized signal samples an amount corresponding to the delay produced by the regeneration filter when the updating the equalization filter coefficients.

The machine readable medium has further instructions which, when executed by the processor, causes the processor to generate an offset signal from the real component values of the complex valued error signal representative of a DC offset in the complex valued unequalized signal samples, and combine the offset signal with the complex valued unequalized signal samples to reduce the DC offset in the complex valued unequalized signal samples prior to filtering.

The machine readable medium has further instructions which, when executed by the processor, causes the processor to scale the complex valued error signal with a variable convergence factor. The machine readable medium may further include instructions which, when executed by the processor, causes the processor to calculate running standard deviation values of the real component values of the complex valued error signal, and generate an output signal to indicate achievement of equalizer convergence.

The objects, advantages and novel features of the present invention are apparent from the following detailed description when read in conjunction with the appended claims and attached drawings.

BRIEF DESCRIPTION OF THE DRAWINGS

The present invention is illustrated by way of example in the figures of the accompanying drawings, in which like references indicate similar elements and in which.

DETAILED DESCRIPTION OF THE PREFERRED EMBODIMENT

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a computer system, using terms such as data, values, signal samples, flags, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined and otherwise manipulated through mechanical and electrical components of the computer system; and the term computer system includes general purpose as well as special purpose data processing machines, systems, and the like, that are stand alone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentation.

The structure and function of adaptive equalizer according to the present invention will be described using signal samples acquired from an 8-VSB digital television signal. It is understood that other digital transmission signals may be equalized using the present invention where the imaginary component values of the complex signal are a function of the real component values of the signal. For an 8-VSB signal, the equalizer 60 update process occurs at symbol intervals, which for an 8-VSB signal occurs at an approximately 10 Msymbol/sec rate or every 100 nsec. To cover a 2 microsecond range of spreading and recombination requires approximately 20 symbol intervals. In the preferred embodiment of the present invention, the 8-VSB signal is sampled at four times the symbol rate requiring 80 samples for the 2 microsecond range. Further, the adaptive equalizer 60 of the present invention is implemented as part of a software based demodulation system 54 as described in co-pending patent application Ser. No. 09/185,218, filed Nov. 3, 2001.

Figure 2:
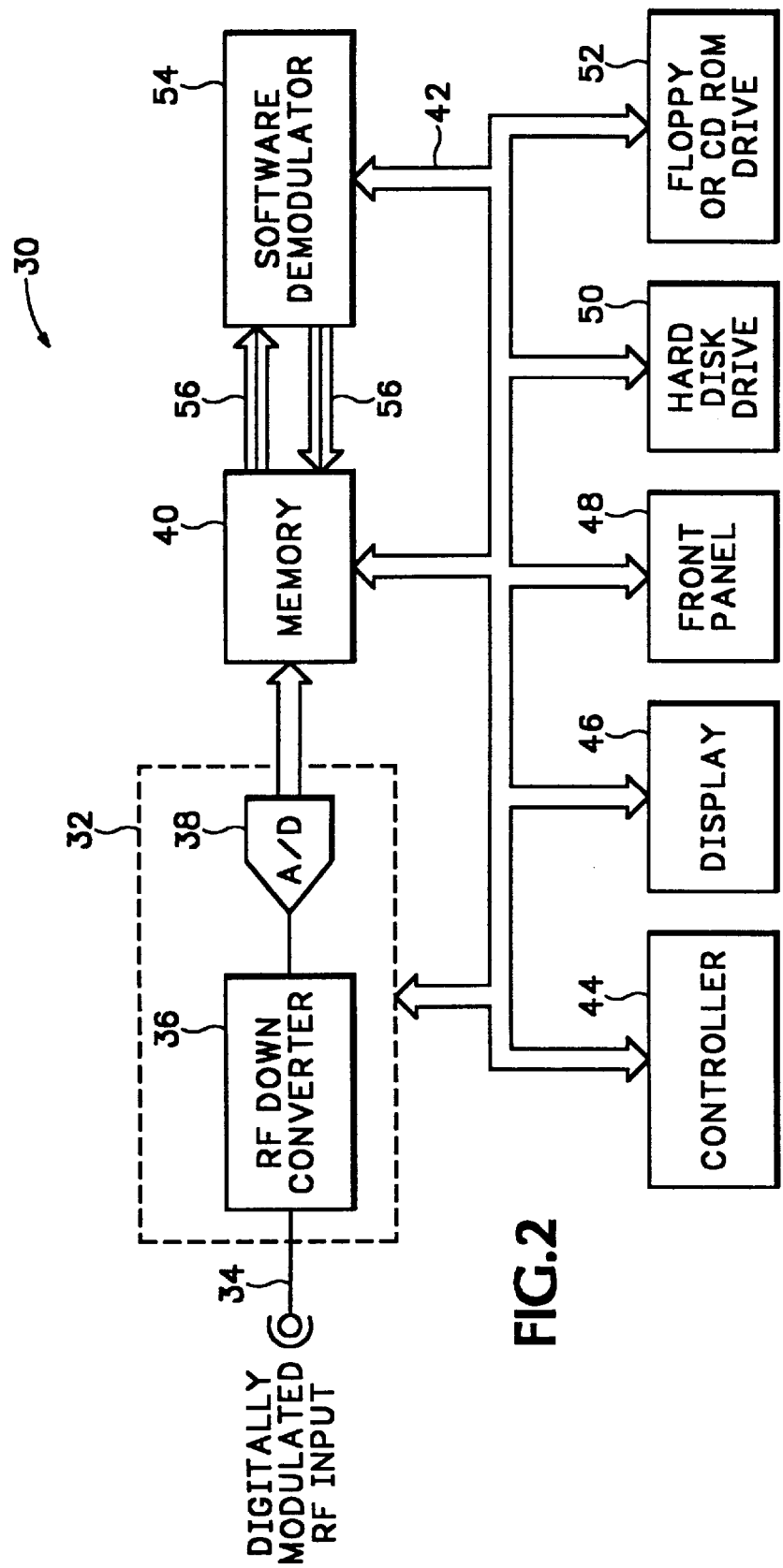
FIG. 2 is a block diagram illustrative of a transmission receiver system incorporating the adaptive equalizer with complex signal regeneration according to the present invention.

FIG. 2 shows a representative block diagram of a transmission system receiver 30, as could be used in a measurement instrument, digital television receiver or the like. The transmission system receiver 30 includes a hardware front end 32 receiving a digitally modulated RF input signal 34. The RF signal 34 is down converted to a digitally modulated intermediate frequency (IF) signal by RF hardware down converter circuitry 36 that generally includes one or more mixers in the IF signal path. Each mixer is driven by a local oscillator. An analog-to-digital (A/D) converter 38 receives the digitally modulated IF signal and converts the signal to digital data values that are stored in memory 40. Memory 40 includes both RAM, ROM and cache memory with the RAM memory storing volatile data, such as the data values representative of the IF signal and the like. A data and control bus 42 couples memory 40 to a controller 44, such as PENTIUM® microprocessor, manufactured and sold by Intel, Corp., Santa Clara, Calif. The data and control bus 42 is also coupled to the front end hardware 32, a display device 46, such a liquid crystal display, cathode ray tube or the like, a front panel 48, a data storage device, such as a hard disk drive 50, and floppy and/or CD ROM drive(s) 52. A software demodulator 54 is representatively shown connected to the bus 42 and coupled to memory 40. The software demodulator 54 executes various processes that are performed by the controller 44 using processing routines stored in memory 40 including program instructions performing the equalizer 60 functions shown in the accompanying figures. Data flow lines 56 connect the memory 40 with the software demodulator 54 for showing the movement of data from the memory 40 to the software demodulation process and back. The program instructions may be stored and accessed from the ROM memory 40, the hard disk drive 50 or a removable medium, such as a floppy disk or CD ROM, read from the floppy disk or CD ROM drive(s) 52. The transmission system receiver 30 in the preferred embodiment of the invention is a PC based system controlled under WINDOWS® 95 operating system, manufactured and sold by Microsoft, Corp., Redmond, Wash. The adaptive equalizer 60 of the present invention may also be implemented using hardware circuitry performing the same functions as described for the software implementation.

Figure 1:
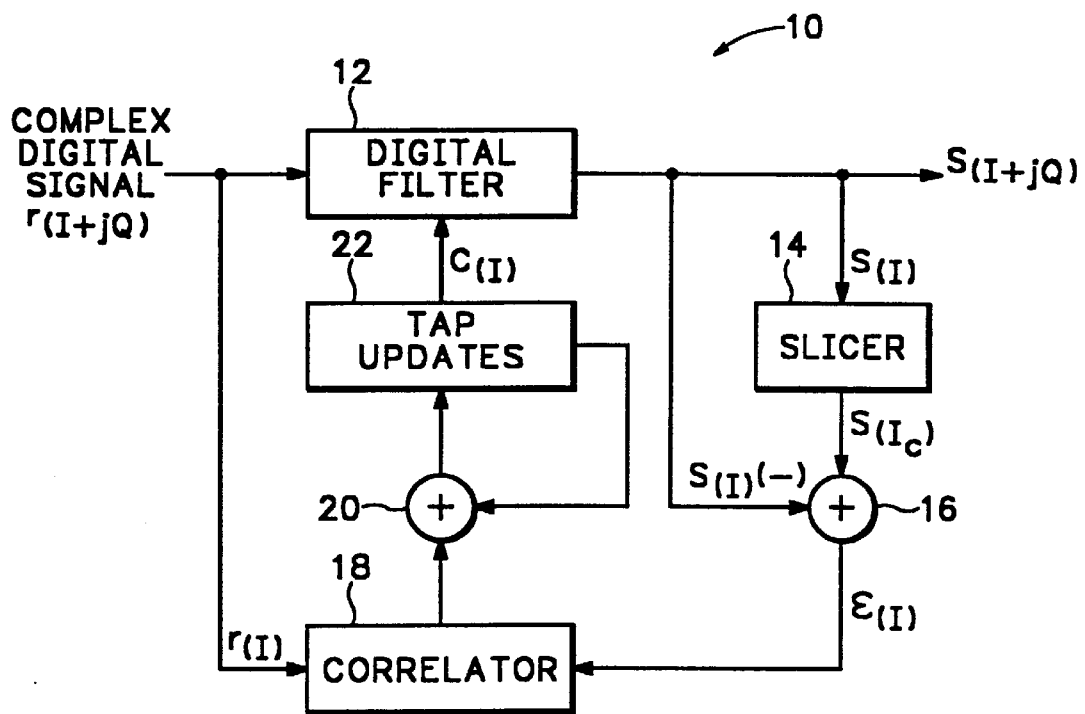
FIG. 1 is a block diagram illustrative of an adaptive equalizer known in the art.
Figure 3:
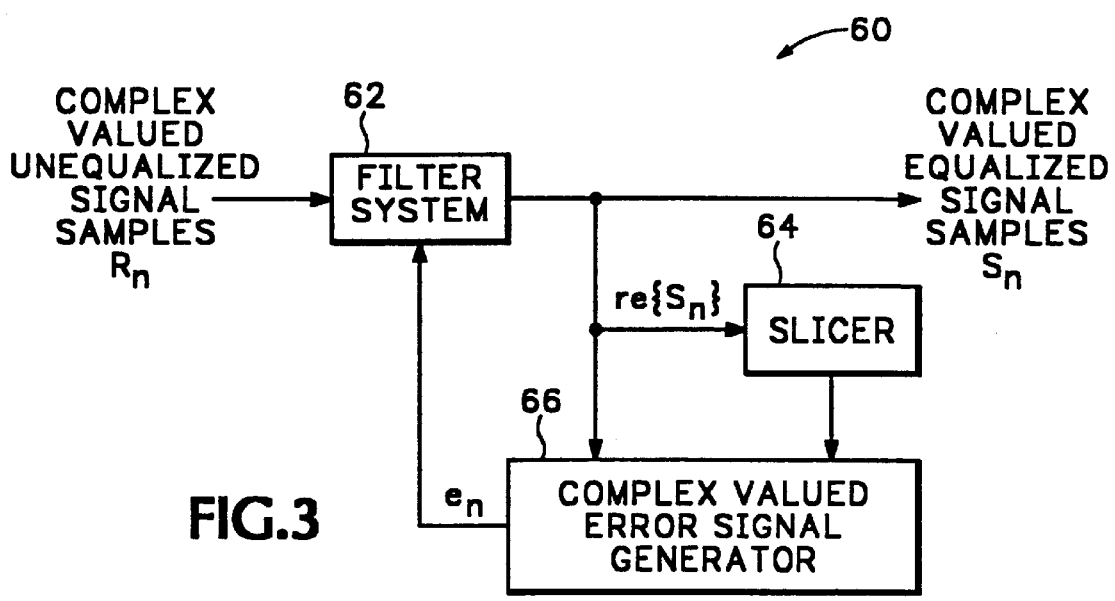
FIG. 3 is a block diagram illustrative of an adaptive equalizer with complex signal regeneration according to the present invention.

Referring to FIG. 3, the input to adaptive equalizer 60 are complex valued unequalized signal samples $r_n$ generated by down converting and digitizing the 8-VSB signal. The signal samples are stored in memory 40 and acted on by processes of the demodulator to down convert the signal samples to baseband, apply the transmission system receiver filter, and time align the signal samples. The time aligned-baseband-filtered complex valued unequalized signal samples input to the equalizer 60. In the preferred embodiment, approximately 2,000 symbols are processed through the adaptive equalizer 60. The exact number of symbols processed is a matter of design choice but the number should be sufficient to reduce the error signal to a minimum and hence achieve maximum convergence of the equalizer 60 within a reasonable amount of time. A filter system 62 receives the complex valued unequalized signal samples $r_n$ and generates complex valued equalized signal samples $s_n$. The complex filter includes a FIR filter, a multiplier and adder, and a delay to be described in greater detail below. The FIR filter receives updatable filter coefficients values for equalizing the incoming signal samples. A slicer 64 receives the real component values $re\{s_n\}$ of the complex valued equalized signal samples and generates ideal real component values from the real component values. A complex valued error signal generator 66 receives the ideal real component values and the complex valued equalized signal samples. The complex valued error signal generator 66 includes first and second delays, a regeneration filter and a combiner to be described in greater detail below. Ideal imaginary component values are regenerated from the ideal real component values from the slicer 64. The ideal real component values from the slicer 64 are time aligned with the ideal imaginary component values to produce an ideal complex valued reference signal. The equalized complex valued signal samples $s_n$ are time aligned with the reference signal and combined to produce a complex valued error signal $e_n$. The error signal $e_n$ is fed back to the filter system 62 and combined with time aligned vectors of unequalized signal samples for updating the filter coefficients values of the filter system 62.

Figure 4:
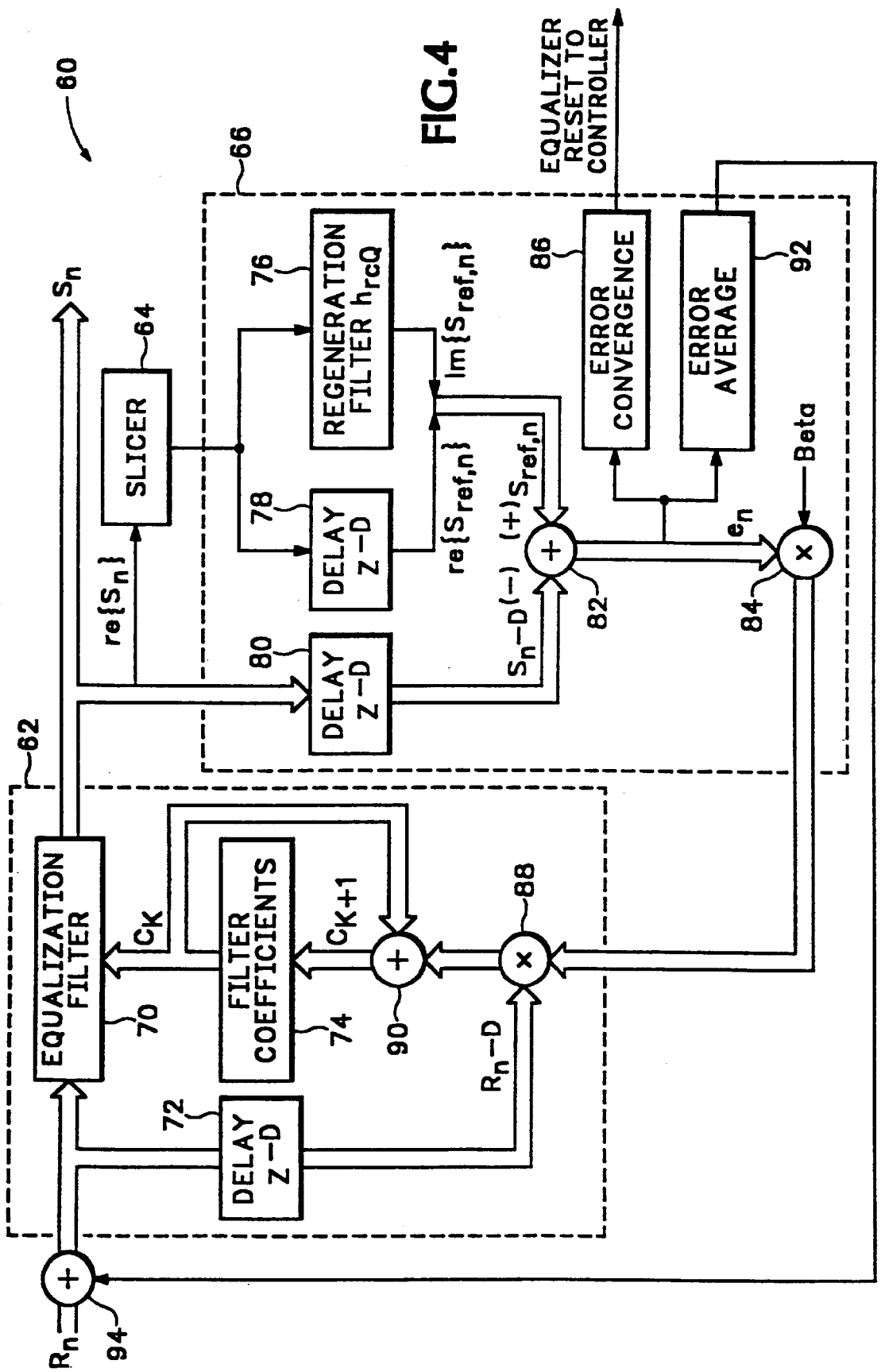
FIG. 4 is a more detailed block diagram illustrative of the adaptive equalizer with complex signal regeneration according to the present invention.

FIG. 4 shows a more detailed block diagram of the adaptive equalizer 60 of the present invention. The double lines in the figure represents complex valued data and the single lines represents either real or imaginary component values of the complex valued data. The filter system 62 includes a FIR equalization filter 70 and a delay 72 receiving the complex valued unequalized signal samples $r_n$ of the 8-VSB signal stored in memory 40. The number of taps in the equalization filter is determined by a number of factors including the sample frequency of the incoming signal, the time interval to be covered by the filter and the like. As previously described, the preferred embodiment of the invention uses signal samples of the 8-VSB signal digitized at four times the 8-VSB symbol rate. The equalization filter 70 has 80 taps to cover a spreading and recombination range of 2 microsec. (20 symbols×100 nsec./symbol×4 samples per symbol). The equalization filter 70 taps receive updatable coefficients $c_k$ 74 for progressively removing the linear impairments in the 8-VSB signal. The output of the equalization filter 70 is complex valued equalized signal samples $s_n$ computed as $$s_n = r_n \otimes c_k \quad (1)$$

where $r_n$ is the received unequalized signal samples, $c_k$ is the current equalization filter tap set, $s_n$ is the filtered equalized signal samples, and $\otimes$ denotes convolution. The delay 72 sufficiently retards the complex values unequalized signal samples to time align the vectors of unequalized signal samples with the corresponding error signal from the complex valued error signal generator 66.

The complex valued error signal generator 36 receives the complex valued equalized signal samples from the equalization filter. The slicer 64 receives the "I" or real component values $re\{s_n\}$ of the equalized signal samples at symbol intervals. The slicer 64 operates in a conventional manner to produce ideal real or "I" component values at the symbol intervals from the real component values. The ideal real component values drive an imaginary or "Q" component regeneration filter $h_{RCQ}$ 76 in the error signal generator 66.

In the preferred embodiment of the present invention, the regeneration filter $h_{RCQ}$ 76 has filter coefficients that produce the imaginary part of a complex raised cosine filter function as represented by the below equation.

$$h_{RCQ} = im\{h_{RC}\} \quad (2)$$

The complex raised cosine filter function $h_{rc}$ is the system response filter function of the 8-VSB transmission system. The regeneration filter 76 produces ideal imaginary or "Q"component values $im\{s_{ref,n}\}$ at symbol intervals based on the ideal real component values from the slicer 64. In the preferred embodiment of the present invention, the regeneration filter 76 is a FIR filter, with L=255 taps at symbol interval spacing. The desired response of the regeneration filter 76 depends on the overall filter response of the transmission system in which the adaptive equalizer 60 of the present invention is used. A trade-off is necessary in determining the number of taps in the regeneration filter 76. Increasing the number of taps in the filter increases the accuracy of the filter but decreases the filter speed. A 255-tap filter was chosen as compromise between filter speed and accuracy. The regeneration filter 76 is not limited to the specific 255-tap raised cosine filter function and other filter sizes and filter functions may be used without departing from the scope of the invention set forth in the appended claims.

A delay $z^{-D}$ 78 receives the ideal real component values from the slicer 64 and delays these values an amount corresponding to the delay produced by the regeneration filter 76 to time align the ideal real component values $re\{s_{ref,n}\}$ with the regenerated ideal imaginary component values $im\{s_{ref,n}\}$. The regeneration filter 76 delay corresponds to $D=(L-1)/2$ for a filter with an odd number of filter taps or $L/2$ for an even number of filter taps. A mathematical representation of the reference ideal signal samples $s_{ref,n}$ containing the time aligned real and imaginary component values $re\{s_{ref,n}\}$ and $im\{s_{ref,n}\}$ is:

$$s_{ref,n} = \text{slicer}(re\{s_{n-D}\}) + j \cdot [\text{slicer}(re\{s_n\}) \otimes h_{RCQ}] \quad (3)$$

The complex valued equalized signal samples pass though delay $z^{-D}$ 80 that retards the signal samples an amount corresponding to the delay of the regeneration filter to time align the signal samples $s_{n-D}$ to the corresponding reference signal samples $s_{ref,n}$. The delays 72, 88, and 80 provide storage to synchronize the various equalizer signal samples and component values with the regeneration filter 76 output. A combiner 82 receives the reference signal samples $s_{ref,n}$ of the complex valued equalized signal samples and the time aligned complex valued equalized signal samples $s_{n-D}$ from delay 80. The combiner performs a summation process to produce a complex valued error signal $e_n$ from the difference between the complex valued equalized signal samples and the reference signal samples as shown below.

$$e_n = s_{ref,n} - s_{n-D} \quad (4)$$

In traditional adaptive equalizers, a fixed adaptation factor or scaler is applied to the error signal fed back to the filter system 62 for updating the equalization filter coefficients 74. The value of the constant adaptation factor is a tradeoff between convergence speed and noise in the equalizer 60 output. A large adaptation factor value allow a greater range of values for the equalization filter coefficients for faster convergence. However, as the coefficients converge, they can still vary over the range set by the adaptation factor. The variation in coefficient values translates into noise in the output of the equalizer 60. Smaller adaptation factors reduce the noise but slow the convergence process and may not provide sufficient coefficient variation even to allow convergence.

In the preferred embodiment of the present invention, a variable adaptation factor, β, is applied to the complex valued error signal $e_n$ for controlling the convergence of the adaptive equalizer 60. β is applied to a multiplication function 84 along with the complex valued error signal $e_n$. β scales the error signal $e_n$ to vary the convergence of the equalizer 60 over one or more successive inputs of the unequalized signal samples. As convergence is achieved with successive iterations of the unequalized signal samples through the equalizer 60, the value of beta is decreased. In the present invention, the initial value of beta is set to $2.5 \times 10^{-5}$. This value was derived empirically by applying distorted data to the equalizer 60 and observing how the equalizer converged. The stored unequalized signal samples are passed through the equalizer up to three times with the value of beta being respectively decreased to $2.5 \times 10^{-3}$ and $2.5 \times 10^{-5}/10$.

The adaptive equalizer 30 of the present invention and the process of equalization is referred to in the art as a decision or data directed equalizer. If during the convergence process, the error signal $e_n$ does not progressively decrease indicating convergence of the equalizer 30, the controller 44 may initiate a blind equalization process to determine initial coefficient values for the equalization filter before progressing to the decision directed equalization process. In the preferred embodiment of the present invention, an convergence detection filter 86 receives the real component values of the error signal and calculates a running standard deviation. The convergence detection filter 86 generates an output signal, such as a flag, true/false indication or the like, to indicate achievement of equalizer convergence. The controller 44 receives the output signal and initiates the blind equalization process when the standard deviation of the error signal does not decrease. The above described variable adaptation factor and use is by example only. Other adaptation factor values may be used as well as increasing or decreasing the number of values as well as the number of passes of the input data without departing from the scope of the invention.

The complex valued error signal $e_n$, scaled by beta, is fed back to a multiplier 88 in the filter system 62. The multiplier 88 also receives delayed vectors of unequalized signal samples from delay $z^{-D}$ 72 that are time aligned with the error signal $e_n$. The delay 72 retards the vectors of unequalized signal samples an amount corresponding to the delay of the regeneration filter 76. The conjugate of the signal samples in the vector array being applied to the multiplier 88 is obtained by changing the sign of the imaginary part of the signal samples in the vectors. The multiplier 88 performs a multiplication function on the vectors using the complex valued error signal $e_n$ as a scaler. An adder 90 receives the scaled vectors along with the current equalization filter coefficient values $c_k$ 74. The filter coefficient values 74 are updated by adding the error signal scaled vector array values with the current filter coefficient values as represented by the equation below:

$$c_k + 1 = c_k + \beta \cdot e_n \cdot conj(r_{n-D}) \quad (5)$$

The updated coefficient values 74 are applied to the equalization filter 70.

As previously stated, the adaptive equalizer 60 of the present invention equalizes signal samples of a digitized and down converted 8-VSB signal. One component of the 8-VSB signal is a pilot tone that is removed after the down conversion to baseband. Incomplete removal of the pilot tone produces a DC offset in the real component values of the signal samples applied to the equalizer 60, which generates a DC error term in the real component values of the error signal adversely effecting the equalization process. In the preferred embodiment of the present invention, an offset filter 92 receives the real component values of the error signal and generates an estimate of the real component offset. The offset estimate is calculated over subsets of the overall set of signal samples. The offset estimate of the subsets is fed back to a combiner 94 at the input to the filter system 62. The combiner 94 subtracts the offset estimate from the incoming real component values of the unequalized complex valued signal samples $r_n$ to decrease the DC offset that may be present due to the pilot tone in the signal samples. As the equalization process proceeds, the offset estimate feed back process continually improves the DC offset suppression.

Figure 5:
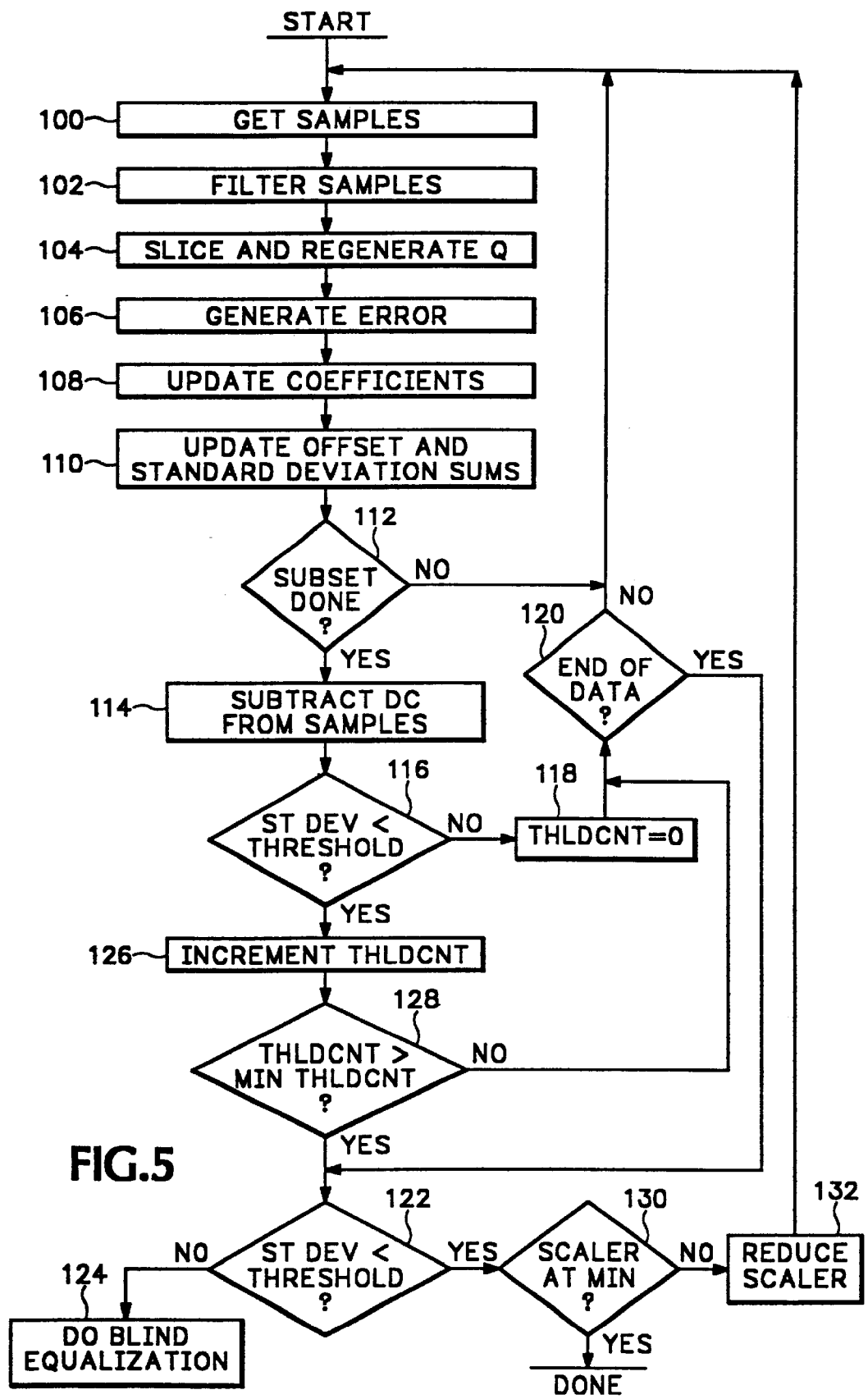
FIGS. 5A and 5B are a flow chart illustrating the equalization process using the adaptive equalizer according to the present invention.

Referring to FIGS. 5A and 5B, there is flow chart illustrating the equalizer process using the adaptive equalizer according to the present invention. The equalization process proceeds from the processor 44 executing instructions from the machine readable medium that reads the complex valued unequalized signal samples from memory 40 as represented in step 100. The signal samples are filtered by the equalization filter 70 to generate complex valued equalized signal samples as represented by step 102. The real component values of the equalized signal samples are sliced in slicer 64 to generate ideal real component values of the signal samples. The complex valued reference signal $s_{ref,n}$ is generated by producing ideal imaginary component values $im_{ref,n}$ from the ideal real component values in the regeneration filter 76 and time aligning the ideal real component values in delay 78 an amount corresponding to the delay of the regeneration filter 76 as represented. The slicing and generating of the reference signal $s_{ref,n}$ is represented in step 104. The complex valued error signal $e_n$ is generated by determining the difference between the complex valued reference signal $s_{ref,n}$ and the complex valued equalized signal samples $s_{n-D}$ that have been delayed in delay 80 an amount corresponding to the delay of the regeneration filter 76 as represented in step 106. The error signal is applied to the time aligned vectors of unequalized signal samples to generate coefficient update values and the filter coefficient update values are added to the current equalization filter values to generate updated filter coefficient values as represented in step 108. The real component values of the error signal are processed by the DC offset filter 92 and the convergence detection filter 86 to update the offset sum in the DC offset filter and the standard deviation sum in the convergence detection filter as represented in step 110. The foregoing steps are applied to each of the signal samples in the subset as represented by decision step 112.

When the complete subset of signal samples is sampled, the offset error from the offset error filter is subtracted from the signal samples as represented in step 114. If the standard deviation from the convergence detection filter is greater than the threshold as represented in decision step 116, the threshold counter is set to zero as represented by step 118. In the preferred embodiment of the present invention, the threshold values is set for ±0.25 constellation units. In the 8-VSB system, there are eight odd-valued constellation levels with the maximum value between any two levels being a value of 2.0. The ±0.25 threshold value is an arbitrary value that is small enough to provide an indication convergence is occurring and large enough so as not to prevent a continuous indication of non-convergence. The threshold is used as an example only and other threshold values may be used. If another subset of signal samples is available for processing then the previously described steps are performed on the new subset as shown in decision step 120. If the end of the data set is reached and the threshold count is not greater than zero then the standard deviation sum is compared against the threshold as shown in decision step 122. A standard deviation sum greater than the threshold is an indication that convergence is not occurring and signal is sent to the controller 44 to initiate the blind equalization as represented in step 124. The threshold counter is incremented in step 126 when the standard deviation sum is less than the threshold. Decision step 128 compares the threshold count against the minimum threshold count, which in the preferred embodiment is 10, and processes the next subset of data when threshold count is less than the minimum threshold. A threshold count greater than the minimum threshold count means that error standard deviation has been below its threshold a sufficient amount of time, decision step 122 passes to decision step 130 which determines if the scaler is at a minimum. If the scaler is not at the minimum, the scaler is reduced as represented in step 132 and the next iteration is performed on the sample block. It should be noted that the process is designed so that at any time the threshold count is greater than the minimum threshold count, the scaler is reduced. This allows the equalization process to rapidly achieve convergence without having to process the entire signal sample set for each scaler value. Optimal equalization is achieved when the scaler value is at the minimum and the error standard deviation is below threshold value.

The above described adaptive equalizer and method with Q-channel regeneration has been described as a series of instruction executed by a processor of a transmission system receiver on unequalized signal samples stored in a memory. The elements and structure of the adaptive equalizer and method of the present invention may equally be implemented using hardware circuitry. The elements of the adaptive equalizer may be implemented as discrete filters, logic circuits and delay lines. Alternatively, the elements may be implemented in one or more application specific integrated circuit (ASIC) device(s) or a combination or discrete circuit element and ASIC device(s).

An adaptive equalizer and method with Q-channel regeneration has been described having a filter system, a slicer and a complex valued error signal generator. The filter system includes a equalization filter having updatable filter coefficients that generated equalized complex values signal samples from unequalized complex valued signal samples. The real component values of the equalized signal samples are sliced to produce ideal real component values. A regeneration filter receives the ideal real component values and generates ideal imaginary component values of the equalized signal samples. The ideal real component values are time aligned with the ideal imaginary component values from the regeneration filter using a delay to produce an ideal reference signal. The equalized signal samples are time aligned with the reference signal using a delay and the difference between the time aligned equalized signal samples and the reference signal is computed to generate a complex valued error signal. The error signal is scaled by a variable scaler and applied to vectors of time aligned unequalized signal samples to generate equalization filter update values. The update values are added to the current equalization filter update values to generate new coefficient values for the equalization filter. The time aligning delays correspond to the delay produced by the regeneration filter. The real component values of the error signal are also processed to generate a DC offset signal that is fed back to the input of the equalizer to reduce DC signal component in the real component of unequalized signal samples. The real component values of the error signal are also processed to generate a convergence output signal that indicates convergence or reinitializes the equalization filter coefficients, the variable scaler and the equalization process.

Thus, an adaptive equalizer with Q-channel regeneration and method for equalizing complex valued unequalized signal samples has been described. Whereas many alteration and modifications to the present invention will be comprehended by a person skilled in the art after having read the foregoing description, it is to be understood that the particular embodiments shown and described by way of illustration are in no way intended to be considered limiting. References to details of particular embodiments are not intended to limit the scope of the appended claims.

What is claimed is:

1. An adaptive equalizer with Q-channel regeneration comprising:
   a filter system receiving complex valued unequalized signal samples and generating complex valued equalized signal samples;
   a slicer receiving real component values of the complex valued equalized signal samples and generating ideal real component values; and
   a complex valued error signal generator receiving the ideal real component values and the complex valued equalized signal samples and producing a complex valued error signal with real component values of the error signal being derived from the real component values of the complex valued equalized signal samples and the ideal real component values and imaginary component values of the complex valued error signal being derived from the imaginary component values of the complex valued equalized signal samples and ideal imaginary component values regenerated from the ideal real component values, with the complex valued error signal being combined with time aligned vectors of complex valued unequalized signal samples in the filter system for updating filter coefficient values of the filter system.

2. The adaptive equalizer as recited in claim 1 wherein the filter system further comprises:
   a equalization filter having filter coefficient values updatable from initial values for generating the complex valued equalized signal samples from the received complex valued unequalized signal samples;
   a delay receiving the complex valued unequalized signal samples and generating delayed vectors of complex valued unequalized signal samples time aligned with the complex valued error signal values;
   a multiplier receiving the time aligned vectors of complex valued unequalized signal samples and the complex valued error signal for generating equalization filter coefficient correction values;
   an adder receiving the coefficient correction values and current equalization filter coefficient values for generating updated equalization filter coefficient values.

3. The adaptive equalizer as recited in claim 1 wherein the complex valued error signal generation further comprises:
   a regeneration filter receiving the ideal real component values and generating ideal imaginary component values;

a first delay receiving the ideal real component values and generating ideal real component values time aligned with the generated ideal imaginary component values;

a second delay receiving the complex valued equalized signal samples and generating complex valued equalized signal samples time aligned with the ideal real and imaginary component values; and a combiner receiving the time aligned complex valued equalized signal samples and the ideal real and imaginary component values for generating the complex valued error signal from the difference between the time aligned complex valued equalized signal samples and the ideal real and imaginary component values.

4. The adaptive equalizer as recited in claim 3 wherein the regeneration filter is a FIR filter.

5. The adaptive equalizer as recited in claim 4 wherein the FIR filter has filter coefficients that produce imaginary component output values of a complex raised cosine filter.

6. The adaptive equalizer as recited in claim 1 further comprising:

an offset filter receiving the real component values of the error signal and generating an output signal representative of a DC offset in the complex valued unequalized signal samples; and a combiner receiving the output of the offset filter and real component values of the complex valued unequalized signal samples and generating real component values of the complex valued unequalized signal samples with reduced DC offset from the difference between the complex valued unequalized signal samples and the output of the offset filter.

7. The adaptive equalizer as recited in claim 3 wherein the complex valued error signal generation further comprises a multiplier receiving the complex valued error signal and a variable scaler value for scaling the complex valued error signal.

8. The adaptive equalizer as recited in claim 3 further comprising an equalizer convergence filter receiving the real component values of the error signal and generating an output signal indicative of equalizer convergence.

9. An adaptive equalizer with Q-channel regeneration comprising:

a filter system receiving complex valued unequalized signal samples and generating complex valued equalized signal samples;

a slicer receiving real component values of the complex valued equalized signal samples and generating ideal real component values;

a regeneration filter receiving the ideal real component values and generating ideal imaginary component values;

a first delay receiving the ideal real component values and generating ideal real component values time aligned with the generated ideal imaginary component values;

a second delay receiving the complex valued equalized signal samples and generating complex valued equalized signal samples time aligned with the ideal real and imaginary component values; and a combiner receiving the time aligned complex valued equalized signal samples and the ideal real and imaginary component values for generating a complex valued error signal from the difference between the time aligned complex valued equalized signal samples and the ideal real and imaginary component values, with the complex valued error signal being combined with time aligned vectors of complex valued unequalized signal samples in the filter system for updating filter coefficient values of the filter system.

10. The adaptive equalizer as recited in claim 9 wherein the filter system further comprises:

a equalization filter receiving filter coefficient values updatable from initial values and generating the complex valued equalized signal samples from the received complex valued unequalized signal samples;

a delay receiving the complex valued unequalized signal samples and generating delayed vectors of complex valued unequalized signal samples time aligned with the complex valued error signal values;

a multiplier receiving the time aligned vectors of complex valued unequalized signal samples and the complex valued error signal for generating equalization filter coefficient correction values;

an adder receiving the coefficient correction values and current equalization filter coefficient values for generating updated equalization filter coefficient values.

11. The adaptive equalizer as recited in claim 9 wherein the regeneration filter is a FIR filter.

12. The adaptive equalizer as recited in claim 11 wherein the FIR filter has filter coefficients that produce imaginary component output values of a complex raised cosine filter.

13. The adaptive equalizer as recited in claim 9 further comprising:

an offset filter receiving the real component values of the error signal and generating an output signal representative of a DC offset in the complex valued unequalized signal samples; and a combiner receiving the output of the offset filter and real component values of the complex valued unequalized signal samples and generating real component values of the complex valued unequalized signal samples with reduced DC offset from the difference between the complex valued unequalized signal samples and the output of the offset filter.

14. The adaptive equalizer as recited in claim 10 wherein the complex valued error signal generation further comprises a multiplier circuit receiving the complex valued error signal and a scaler value for scaling the complex valued error signal.

15. The adaptive equalizer as recited in claim 14 further comprising an equalizer convergence filter receiving the real component values of the error signal and generating an output signal indicative of equalizer convergence.

16. A method of equalizing complex valued unequalized signal samples comprising the steps of:

a) filtering the complex valued unequalized signal samples using a equalization filter having filter coefficient values updatable from initial values to produce complex valued equalized signal samples;

b) slicing real component values of the complex valued equalized signal samples to produce ideal real component values;

c) generating a complex valued reference signal using the ideal real component values as an input to an imaginary component value regeneration filter and time aligning the ideal real component value with the ideal imaginary component value;

d) generating a complex valued error signal by determining the difference between time aligned complex valued equalized signal samples and the reference signal; and e) updating the filter coefficients of the equalization filter by combining the complex valued error signal with time aligned vectors of complex valued unequalized signal samples to produce filter coefficient update values that are combined with the current filter coefficients.

17. The method of equalizing complex valued unequalized signal samples as recited in claim 16 wherein the complex valued reference signal generating step further comprises the step of delaying the ideal real component values an amount corresponding to the delay produced by the regeneration filter.

18. The method of equalizing complex valued unequalized signal samples as recited in claim 16 wherein the complex valued error signal generating step further comprises the step of delaying the complex valued equalized signal samples an amount corresponding to the delay produced by the regeneration filter.

19. The method of equalizing complex valued unequalized signal samples as recited in claim 16 wherein the updating step further comprises the step of delaying the vectors of complex valued unequalized signal samples an amount corresponding to the delay produced by the regeneration filter.

20. The method of equalizing complex valued unequalized signal samples as recited in claim 16 further comprising the step of:
 a) generating a value from the real component values of the complex valued error signal representative of a DC offset in the complex valued unequalized signal samples; and
 b) combining the offset value with the complex valued unequalized signal samples to reduce the DC offset in the complex valued unequalized signal samples prior to filtering.

21. The method of equalizing complex valued unequalized signal samples as recited in claim 16 wherein the complex valued error signal generating step further comprises the step of scaling the complex valued error signal with a variable convergence factor.

22. The method of equalizing complex valued unequalized signal samples as recited in claim 21 further comprising the steps of:
 calculating running standard deviation values of the real component values of the complex valued error signal; and
 generating an output signal indicative of equalizer convergence.

23. A machine readable medium having stored thereon a series of instructions which, when executed by a processor of a transmission system receiver, equalizes complex valued unequalized signal samples by causing the processor to:
 filter the complex valued unequalized signal samples using a equalization filter having filter coefficients values updatable from initial values to produce complex valued equalized signal samples;
 slice real component values of the complex valued equalized signal samples to produce ideal real component values;
 generate a complex valued reference signal using the ideal real component values as an input to an imaginary component value regeneration filter and time aligning the ideal real component value with the ideal imaginary component value;
 generate a complex valued error signal by determining the difference between time aligned complex valued equalized signal samples and the reference signal; and
 update the filter coefficients of the equalization filter by combining the complex valued error signal with time aligned vectors of complex valued unequalized signal samples to produce filter coefficient update values that are combined with the current filter coefficients.

24. The machine readable medium as recited in claim 23 further comprising instructions which, when executed by the processor, causes the processor to delay the ideal real component values an amount corresponding to the delay produced by the regeneration filter when generating the complex valued reference signal.

25. The machine readable medium as recited in claim 23 further comprising instructions which, when executed by the processor, causes the processor to delay the complex valued equalized signal samples an amount corresponding to the delay produced by the regeneration filter when generating of the complex valued error signal includes.

26. The machine readable medium as recited in claim 23 further comprising instructions which, when executed by the processor, causes the processor to delay the vectors of complex valued unequalized signal samples an amount corresponding to the delay produced by the regeneration filter when updating the equalization filter coefficient values.

27. The machine readable medium as recited in claim 23 further comprising instructions which, when executed by the processor, causes the processor to generate an offset value from the real component values of the complex valued error signal representative of a DC offset in the complex valued unequalized signal samples, and combine the offset value with the complex valued unequalized signal samples to reduce the DC offset in the complex valued unequalized signal samples prior to filtering.

28. The machine readable medium as recited in claim 23 further comprising instructions which, when executed by the processor, causes the processor to scale the complex valued error signal with a variable convergence factor.

29. The machine readable medium as recited in claim 28 further comprising instructions which, when executed by the processor, causes the processor to calculate running standard deviation values of the real component values of the complex valued error signal, and generate an output signal indicative of equalizer convergence.

* * * * *